United States Patent [19]
Dombrosky

[11] Patent Number: 5,129,719
[45] Date of Patent: Jul. 14, 1992

[54] PRODUCTION METHOD FOR MAKING HETEROGENEOUS OR ASYMMETRICAL EYEGLASSES OR FRAMES

[76] Inventor: Clarence R. Dombrosky, 4302 Fenwick La., Mt Holly, N.J. 08060

[21] Appl. No.: 617,133

[22] Filed: Nov. 23, 1990

[51] Int. Cl.$^5$ .............................................. G02C 13/00
[52] U.S. Cl. ..................................... 351/177; 351/178
[58] Field of Search ................................ 351/177, 178

[56] References Cited

U.S. PATENT DOCUMENTS

2,631,959  3/1953  McNeill ........................ 351/178 X
3,406,232  10/1968  Barker ......................... 351/178 X Primary Examiner—Scott J. Sugarman
Attorney, Agent, or Firm—W. L. Muckelroy; Iman Abdallah

[57] ABSTRACT

This invention relates to a manufacturing method for production of visibly heterogeneous or asymmetrical sunglasses, eyeglasses or frames. The production method mass produces a product comprising a randomly selected motley assembly of asymmetrical lens frames, for example, wherein a component of the left frame is different from a component in either the left frame or the right frame and/or where the product is sunglasses, the left lens is of a different color from the right lens, for example. Further, in the method both differing aspects may occur in the manufactured product. The sunglasses made by a random selection of right and left framed lenses of different colors, for example, and/or by a random selection of right and left differently framed lenses or by a random selection of both. In the method for manufacturing parts of the frames are randomly selected from sets of randomly pre-assembled sub-assemblies.

16 Claims, 5 Drawing Sheets

PRODUCTION METHOD FOR MAKING HETEROGENEOUS OR ASYMMETRICAL EYEGLASSES OR FRAMES

BACKGROUND OF THE INVENTION

1. Field of the Invention

This invention relates generally to a production method for manufacturing a large quantity of individually unique and distinct novelty glasses which may be either sunglasses or frames for prescription use. Hence, the invention specifically relates to a method for manufacturing either limited editions of sunglasses or limited edition pairs of eyeglass frames, each pair of sunglasses or frames having a random variety of sub-assemblies or components wherein at least two components are visually different or each pair of sunglasses or eyeglass frames having a random variety of shapes or colors for the sub-assemblies and/or sunglass lenses.

2. Description of the Prior Art

A prior art example of novelty glasses, not sunglasses, is shown in Rosenwinkel, et al, U.S. Pat. No. 4,283,127 issued on Aug. 11, 1981. Further, U.S. Pat. No. 4,798,455 issued on Jan. 17, 1989 to Yoe, et al is for a user reconfigurable pair of novelty glasses which includes separate temple pieces that may be readily combined with each other and with other separate eye frames and separate temple pieces by the user to form a variety of outrageously designed novelty sunglasses. Each eye frame may be used for either the users right or left eye and each temple piece and may be used over the users right or left temple and ear. However, the patent does not disclose or suggest a method for mass production of the unique novelty sunglasses disclosed.

The prior art production technology is shown first by U.S. Pat. No. 2,242,663, issued to Smith, on May 20, 1940 and assigned to Bausch and Lomb Optical Company. The Smith patent is directed to a new and improved means and method of setting up eyeglasses, spectacles, rimless mountings and lenses. Smith outlines the replacement of the screw in rimless mountings and the wide spread universal use of a rivet in its place and shows a new means for applying the rivets to rimless lenses. On Mar. 20, 1973, U.S. Pat. No. 3,721,275 was issued to Pforzheim of Germany for a process and apparatus for making polyconal spectacle glass rims. The invention was a process for manufacturing polyconal spectacles lens rims from profiled wire and a machine for carrying out the process. Pforzheim outlined that polyconal spectacles lens rims were previously made from profiled wire in a process in which the wire cut to length and prebent whereinafter a connector was applied and the rims were closed, then sized by being pulled several times over a shaped disk and subsequently subjected to meniscus bending in a die. That process was time-consuming. The Pforzheim invention sought to enable a more efficient manufacture of polyconal spectical glass rims which could be performed automatically.

U.S. Pat. No. 2,921,361 for a method for spectacle frame manufacture was issued to Buckner on Jan. 19, 1960 and assigned to American Optical Company. This invention disclosed improvements in machines for the manufacture of spectacle frames and was for an improved device for making the desired contour shape to the lens receiving portion of the frames. The invention provided a machine of simple construction in which the eye wires of a spectacle frame could be quickly and accurately shaped in an efficient and economical manner.

In many situations in manufacturing, a series of steps repeatedly occur which manufactures a product, for example eyeglasses. This manufacturing event is reproduced a large number of times as a production run under essentially the same conditions; yet the outcomes vary in an irregular manner that defies all attempts at prediction. Such situations give rise to a sequence of random events. Each event producing a slightly different object. In the prior art these objects were rejected. The novel invention utilizes the randomness of the outcomes of each production run to produce a quantity of individually unique products after each run.

Any product of a random production is termed an event. The event consists of any product with the properties E. Associated with a long sequence of random productions will be a number P(E), termed a probability, which gives the relative frequency of the occurrence of E.

The term probability thus used is associated with the outcome of a collection or sequence of random productions and is called a statistical probability.

Let a product be defined as the indecomposable outcome of a random production, e.g., eyeglasses. The product is composed of one or more sample properties E. The array of products (denoted by S) is defined as the aggregate of all the possible combinations of properties E. In the novel method, the properties E are defined by the number of choices N for each part of the eyeglasses. An event containing no properties of the sample space (denoted by 0) is called the null event. In point-set terminology, the spectrum S is a set. A property or part of the product is an element of the set. A group of properties E is a subset of S, and 0 is an empty set.

Let $E_1$ and $E_2$ be two properties in S. Then adopting the following operations from point-set theory:

1. $E_1 + E_2$ is the occurrence of at least one of the properties $E_1$ or $E_2$.
2. $E_1 E_2$ is the simultaneous occurrence of the properties $E_1$ and $E_2$.
3. $E_1 - E_2$ is the occurrence of products with a property $E_1$ not common to $E_2$.

These operations are both associative and distributive; however, only the sum and product operations are commutative. In particular, if two events contain no elementary points in common, they are said to be mutually exclusive events and $E_1 E_2 = 0$.

Assume $X_1$, $X_2$ to be parts (of a product) of a (denumerable) sample space S, and let $E_1, E_2, \ldots$ be a collection of products which are subsets of S. Then the basic axioms of probability state that associated with every event $E_i$ is a real non-negative number termed a probability and denoted by $P(E_i)$ such that $$0 \leq P(E_i) \leq 1$$

If such product has a property $E_i$ and $E_i$ are all mutually exclusive events, then $$P\left(\sum_{i=1}^{N} E_i\right) = \sum_{i=1}^{N} P(E_i)$$

From the above axioms it follows that for any two products having properties $E_1$ and $E_2$ $$P(E_1+E_2) = P(E_1) + P(E_2) - P(E_1E_2)$$

If a product with E can never occur in a sequence of random events, then E is called an impossible event and has the probability $P(E)=0$; similarly, if an event E will always occur at every run of a random production, E is called a certain product and has the probability $P(E)=1$. On the other hand, if an event E has a probability $P(E)=0$, this does not mean that the event E will never occur. All this means is that in a long sequence of random productions the relative frequency of E will be close to zero. This is precisely what the novel production method presented herein utilizes to produce a group of substantially unique eyeglasses. Similarly, if it is known that $P(E)=1$ for an event E, this does not mean that E will occur in every random production, but only that in a long sequence of productions the relative frequency will be close to 1.

For example, consider all numbers included within the interval (0, 1). If one number is drawn at random within this interval, the probability of drawing a rational number is equal to zero. Alternatively, the probability of drawing an irrational number will be equal to one.

The above discussion and relations define briefly the mathematical probability foundation for the method of manufacture of the novel invention where "relatively" unique objects are products of the method over a given production time at a given rate of production or a number of productions using the method. Further, two products with properties or features $E_1$ and $E_2$ are said to be distinct if the probability of the simultaneous occurrence of $E_1$ and $E_2$ is equal to the product of the individual probabilities; that is, if $$P(E_1E_2) = P(E_1)P(E_2)$$

If the product $E_2$ does not exclude the production of the product $E_1$, then some productions of $E_2$ will also occur with productions of $E_1$. The "relative frequency" of $E_1$ in such cases is termed the conditional probability of $E_1$ given $E_2$, written as $P(E_1/E_2)$. If $P(E_2)=0$, then $$P(E_1/E_2) = \frac{P(E_1E_2)}{P(E_2)}$$

and if $E_1$ and $E_2$ are independent, then $$P(E_1/E_2) = P(E_1) \text{ and } P(E_2/E_1) = P(E_2)$$

which is an equivalent definition for independence, i.e., the probability of the product $E_1$ does not depend upon the occurrence of $E_2$, and vice versa.

More generally the independent occurrence of the events $E_1, E_2, \ldots, E_n$ is expressed by $$P(E_1E_2, \ldots, E_n)$$

and the events $E_1, E_2, \ldots, E_n$ are said to be mutually independent if and only if $$P(E_1E_2, \ldots, E_n) = P(E_1)P(E_2) \ldots P(E_n)$$

A variable whose value depends on the outcome of a random production is termed a random (or stochastic) variable.

Associated with any one-dimensional random variable X, for example, one of the pairs of eyeglasses produced by the novel invention, is a unique distribution function (d.f.), F(x), defined as $$F(x) = P(X \leq x)$$

where $P(X \leq x)$ signifies the probability of the product "$X \leq x$". The probability that X takes on a value within the interval $a \leq x \leq b$ is given by $$P(a \leq X \leq b) = F(b) - F(a)$$

From the mathematical definition of probability it follows that (1) F(x) is a nondecreasing function of x, that is, $$F(x_1) \leq F(x_2) \text{ for } x_1 \leq x_2$$

(2) F(x) is everywhere continuous on the right, $$F(x) = \lim F(x+e) \text{ where } e \text{ approaches zero.}$$

$$F(X) = 1 \text{ where } X \text{ approaches infinity.}$$

Thus, the set $(x_s)$ of products for which $P(X=X)>0$ is the spectrum of the random variable X, i.e., the number of unique products or objects to be produced by a stochastic production such as the novel method of the invention.

SUMMARY OF THE INVENTION

This invention is concerned with providing a large number of distinct and unique eyeglass frames and/or distinct and unique sunglasses distinguished by their heterogeneity or their geometric asymmetry or color asymmetry using an assembly process incorporating set theory, random selection of component parts from incongruent sets of each component part whereby a quantity of individually unique sunglasses or eyeglass frames are created.

OBJECTS OF THE INVENTION

The primary purpose of this invention is to provide a production method for manufacturing a large distinct set of novelty glasses, particularly sunglasses, having heterogeneous eyeframes and/or lenses which are distinct in either color or geometry.

A second objective of this invention is to provide a novel manufacturing method which incorporates basic principles of set theory and basic principles of random events or probability to mass produce in limited edition individually unique sunglasses or eyeglass frames.

A further object of this invention is to provide a manufacturing method for making a production run of either heterogeneous or asymmetrical eyeglasses and/or sunglasses each of which appears to be unique.

These and other objects of this novel invention will become apparent to one of ordinary skill in the art from a reading of the foregoing description of the preferred embodiment in combination with the accompanying drawings.

DESCRIPTION OF THE PREFERRED EMBODIMENT

Figure 1:
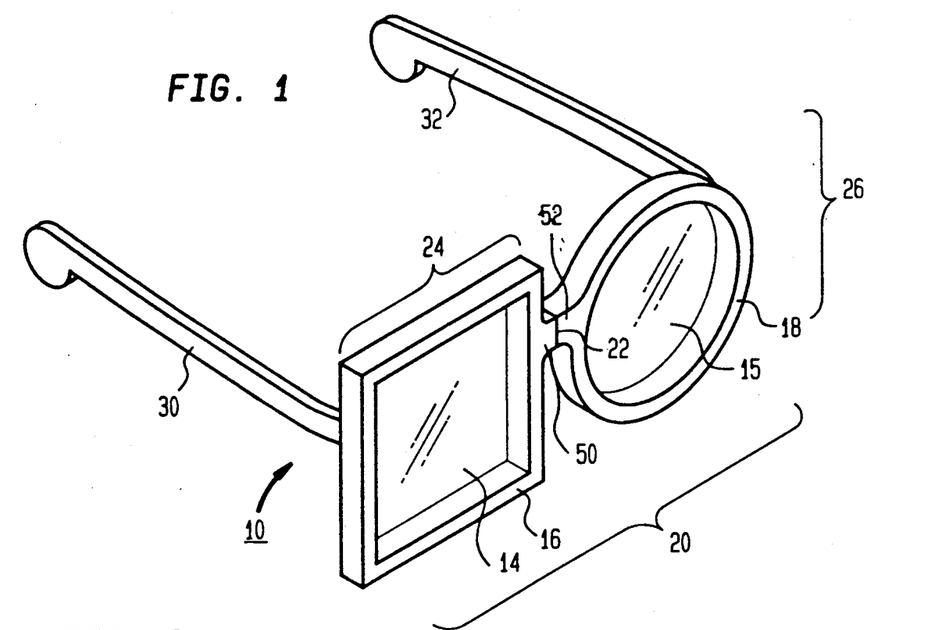
FIG. 1 is a perspective view of a pair of eyeglasses such as produced by the novel method of the invention.

The product produced by the production method of the invention is shown generally in FIG. 1 as an assembly 10. The assembly 10 comprises a right lens 14 and a left lens 15. The right lens 14 is framed by a right portion 16 which makes up the right side of the assembly 10 containing the right lens 14. A left portion 18 of the assembly 10 houses and contains the left lens 15. The right portion 16 and the left portion 18 make up a frame 20. The right portion 16 of the frame 20 is connected to the left portion 18 at a juncture 22. The combination of the right lens 14 and the right portion 16 of the frame 20 comprises the right sub-assembly 24. The left lens 15 and the left portion 18 of the frame 20 comprises the left sub-assembly 26.

The assembly 10 further comprises a right arm 30 connected to the right sub-assembly 24 and a left arm 32 connected to the left sub-assembly 26. The right and left arms 30 and 32 are connected to the frame 20 in the usual and customary manner customarily employed in the art as shown in FIG. 2a, for example, by means of a hinge secured by to the frame 20.

Figures 2A, 2B:
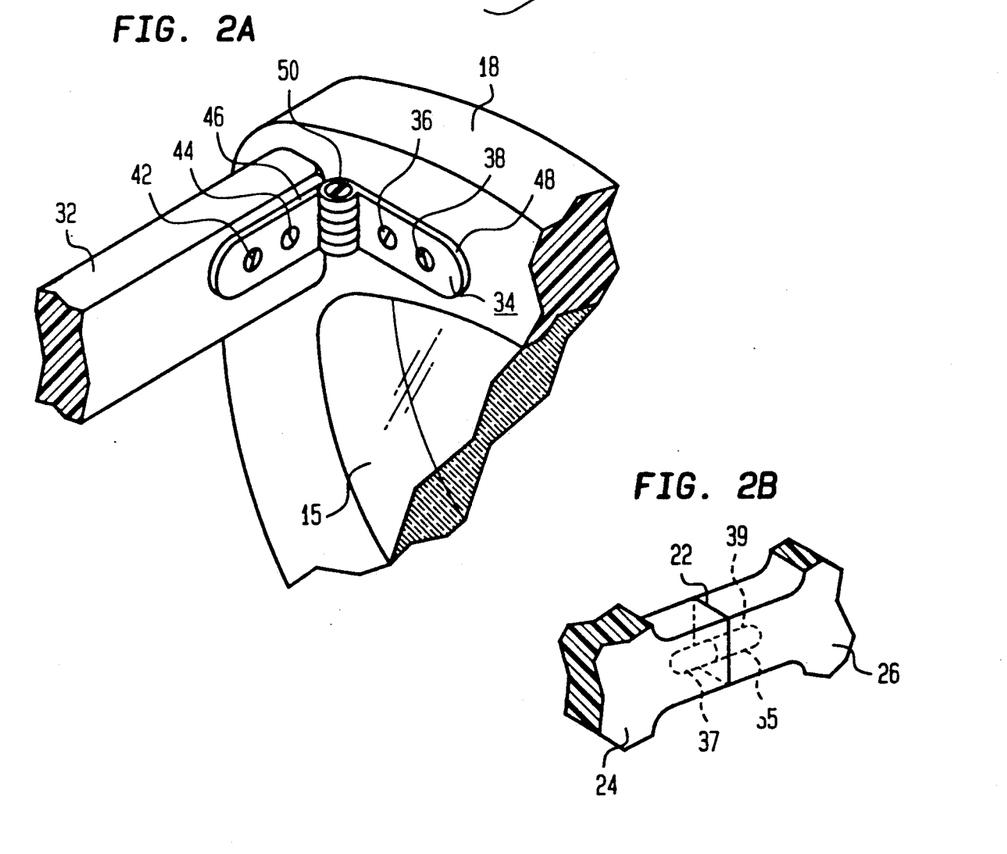
FIG. 2a is a partial perspective view of a hinge structure for a pair of sunglasses such as produced by the novel method of the invention.
FIG. 2b is a partial perspective view of a junction between a left sub-assembly and a right sub-assembly showing a dowel connecting pin.

As shown in FIG. 2a a hinge 34 is connected to the left portion 18. The hinge 34 is also connected to the arm 32. Attachment to the left portion 18 is by means of screws 36 and 38. Attachment to the arm 32 is by means of screws 42 and 44. The hinge 34 is comprised of a member 46 and another similar member 48 connected together by means of a screw pin 50. Referring to FIG. 1, the arm 30 is connected to the right portion 16 i.e., to the right sub-assembly 24 of the frame 20 by another hinge similar to the hinge 34 shown in FIG. 2 but oriented upside down, for example.

In FIG. 2b is shown, a means for perfecting the juncture 22, a dowel pin 35 glued or epoxied into receiving cavities 37 and 39, for example.

Referring again to FIG. 1, a novel method for manufacturing is provided wherein the assembly 10 comprised of the frame 20 and arms 30 and 32 has at least two parts which are either dissimilar or heterogeneous. For example, the assembly 10, a pair of eyeglass frames, is made such that the left portion 16 is distinct from the right portion 18 or the right arm 30 is distinct from the left arm 32. Parenthetically, it should be mentioned that the right and left arms 30 and 32 are connected to the frame 20 by similar hinges 34. The hinges 34 for the purpose of the production technique do not constitute readily visable portions of the eyeglass frame assembly 10. Thus, a non-rejectable product of the method is defined as one wherein the arm 30 is different from the arm 32 in either color, texture, geometry or other visibly identifiable feature. Similarly, an acceptable product is further defined wherein only the frame portion 16 is different from the frame portion 18 in either geometry, texture, color, or other visibly identifiable feature.

The novel method is also adapted to produce a pair of eyeglasses wherein the randomly selected lens 14 is dissimilar or different from the lens 15. For example, the lens 14 may be tinted pink and the lens 15 may be tinted yellow. Moreover, the novel method is adaptable to produce novelty sunglasses wherein either the lens 14 is of a different color from the lens 15 and/or the frame portion 16 is different from the frame portion 18 in either geometry, texture, color or any other visible feature. An acceptable product is also produced wherein any two of the following parts of the assembly 10 are dissimilar: The right arm 30, the left arm 32, the right frame portion 16, the left frame portion 18, the right lens 14, and the left lens 15. Thus, if the right arm 30 is visibly distinguishable and dissimilar from the left frame portion 18 in either color, or other visible feature, the product is acceptable and is not rejected by the method. Preferably, however, at least two of the aforementioned parts of the assembly 10 are different in color. Thus, the novel manufacturing method provides for the production of a large quantity of unique eyeglasses such as shown in FIG. 1 which appear to be custom made utilizing random selection, probability theory and set theory.

The novel method is designed to provide mass production of a large quantity of products, each distinct from the other and for the rejection and re-utilization or cannibalization of parts of products of the method not meeting specific acceptance criteria. A production reject is an assembly 10 or a frame 20 wherein at least two parts are not dissimilar. By dissimilar herein is meant visible distinguishing features other than the left and right spatial orientation of the arms 30 and 32 or the spatial distinction shown by the interconnecting means 50 attached to the right portion 16 and the interconnecting means 52 connected to the left portion 18.

The distinguishing features for at least two members of the set comprising the parts of the assembly 10 are preferably but not necessarily color as between the arm 30 and the arm 32. In the case of a distinction only of the right portion 16 from the left portion 18, it is preferably either one of color or geometry. In the case of a distinction between the lens 14 and the lens 15 the distinction is preferably either color or geometry. As for lens geometry, it may either be dependent or independent of the frame as for example, a rimless design.

Figure 3:
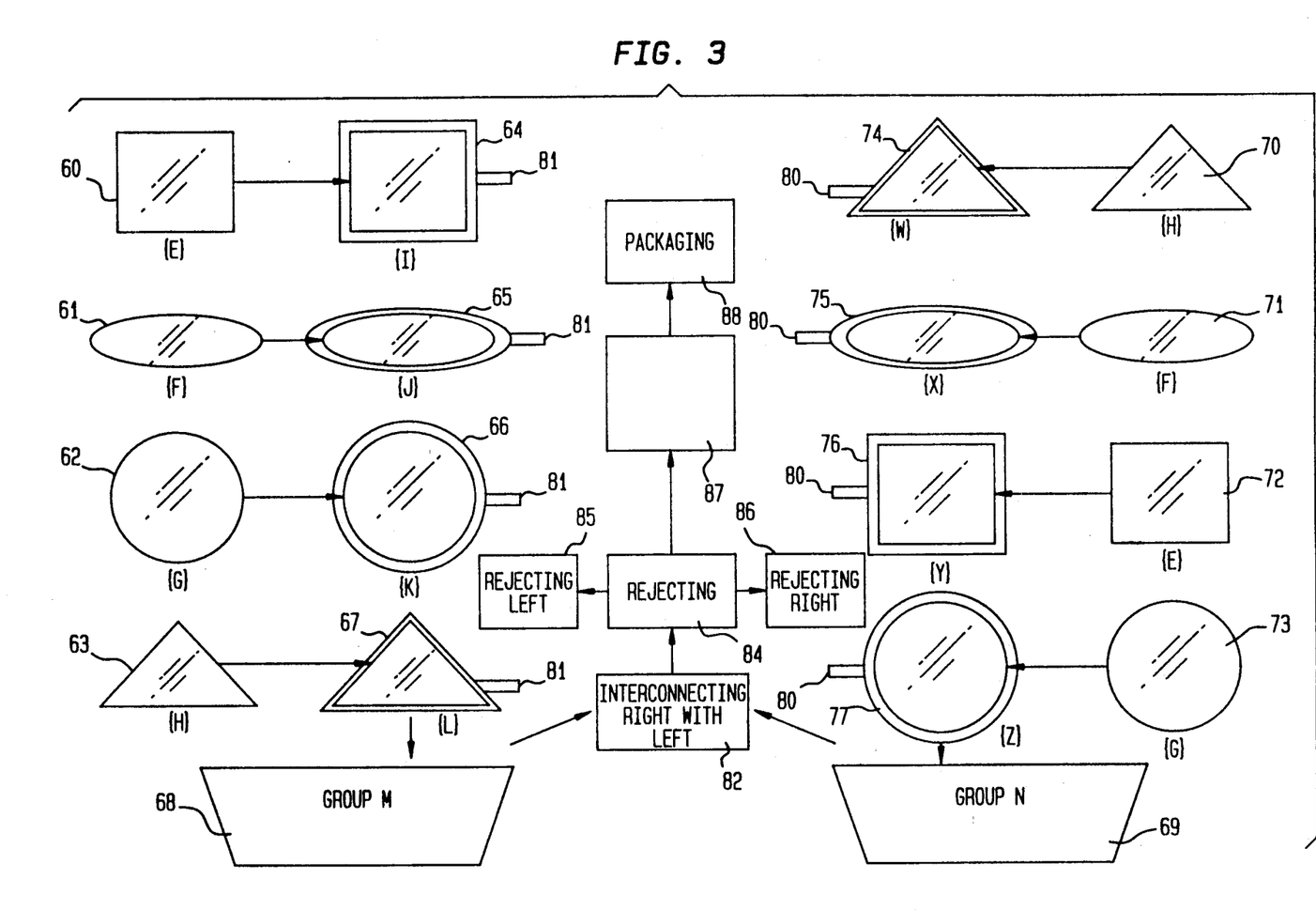
FIG. 3 is a flow diagram of the method for producing the left and right eyeframes or sub-assemblies of the invention wherein each has a different shaped lens.

Referring now to FIG. 3 the assembly 10 shown in FIG. 1 is manufactured from a group of individually different left lenses, for example. Shown in FIG. 3 are left lenses 60, 61, 62, 63 which are distinguishable one from the other by their geometry. The left lens 60 is square, the lens 61 is elliptical, the lens 62 is round and the lens 63 is triangular. For example, the lens 60 is selected from a group of square lenses in a set E. The set E is defined as all geometrically similar lenses wherein each member of the group is of a different color. A set F for the lens 61 is similarly defined. A set G for the lens 62 is also defined in a similar fashion. A set H for the lenses 63 is also similarly defined. A lens 60 selected from set F is inserted into a frame 64 adapted to receive the shape of the lens 60. The left frame 64 is selected from a set I of frames similar to frame 64 each having the same shape but each distinguished from the other by a different color, for example. In similar fashion, frame 65 is defined and selected by a set J, the frame 66 is defined and selected from a set K and the frame 67 is defined and selected from a similarly defined set L. Each of the left frames 64, 65, 66 and 67 with a lens inserted defines a group M or left group 68 as shown in figure 3. A right group 69 is defined by a group N of similarly produced frames 74, 75, 76 and 77 each having a lens therein.

The lens 70 inserted into the frame 74 is selected from a set H, the lens 71 inserted into the frame 74 is selected from the set G, the lens 72 selected from the set F and inserted into the right frame 76. The lens 73 is selected from the set G and inserted into the frame 77.

The frame 74 is selected from a set W which is made up of left triangular frame portions, each distinguished from the other by color, for example. The left elliptical frame 75 is selected from a set X made up of left elliptical frames, each distinguished from the other by color, for example. The left rectangular frame 76 is selected from a set Y consisting of frames of rectangular shape each distinguished from the other by color, for example. Similarly, the left circular frame 77 is selected from a set Z comprised of circular left frame portions, each distinguished from the other by means of color. The frames 74, 75, 76 and 77 each with a lens inserted therein makes up a group N, i.e. group 69. Each member of the group N is spatially distinguished from the group M by an interconnecting means 80 which constitutes a portion of the nose bridge assembly and is adapted to be connected to a receiving means 81 attached to and distinguishing each member of the group M, for example.

A sub-assembly M' is selected from the group M, all M's make up the group 68. A right sub-assembly N' is selected from the group N. All N's make up the group 69. In the method M' is interconnected to N' via means 80 and 81 to form M' plus N'. Next, the assembly M' plus N' is created by the step illustrated as 82 and defined as interconnecting the sub-assembly N' to the sub-assembly M' (as shown in FIG. 2b, for example). Next, the assembly M' plus N' is inspected as shown in step 84 to determine that the assembly is in some way either asymmetrical or visibly heterogeneous. The assembly M' plus N' is asymmetrical if the frame portion from the group M is geometrically distinct from the frame portion selected from the group N. The assembly M' plus N' is heterogeneous if any portion of the frame from the group M is different in color from any other portion of the frame from either the group M or the group N, for example. Moreover, even if the right frame portion and the left frame portion of M' plus N' are both the same color and the same geometry, the assembly is acceptable provided the lens within the left frame portion is a different color from the lens within the right frame portion, for example. For example, if neither geometric dissimilarity or dissimilarity in color exists throughout all parts of M' plus N', then M' is first rejected into a group, for example, into a bin, for disconnecting the left sub-assembly from the right sub-assembly. Then, the left sub-assembly is disconnected and utilized to to reconstitute a new group M and the right sub-assembly after disconnection is utilized to reconstitute a new group N. These are steps 85 and 86, respectively, in FIG. 3.

In the next step in the novel method, for non-rejected M' plus N' there is an attaching step 87 as illustrated in the flow diagram of FIG. 3. In this step, referring also to FIG. 1, the right arm 30 is attached to the right sub-assembly 24 and the left arm 32 is attached to the left sub-assembly 26, for example.

In one aspect of the method, the right and left arms 30 and 32 purposefully match and the assembly of the right and left arm 30 and 32 with the non-rejected frame 20 or M' plus N' is passed to the next step for packaging as shown in the step 88 in FIG. 3. For wire arms, it is preferable that each arm match.

Figure 4:
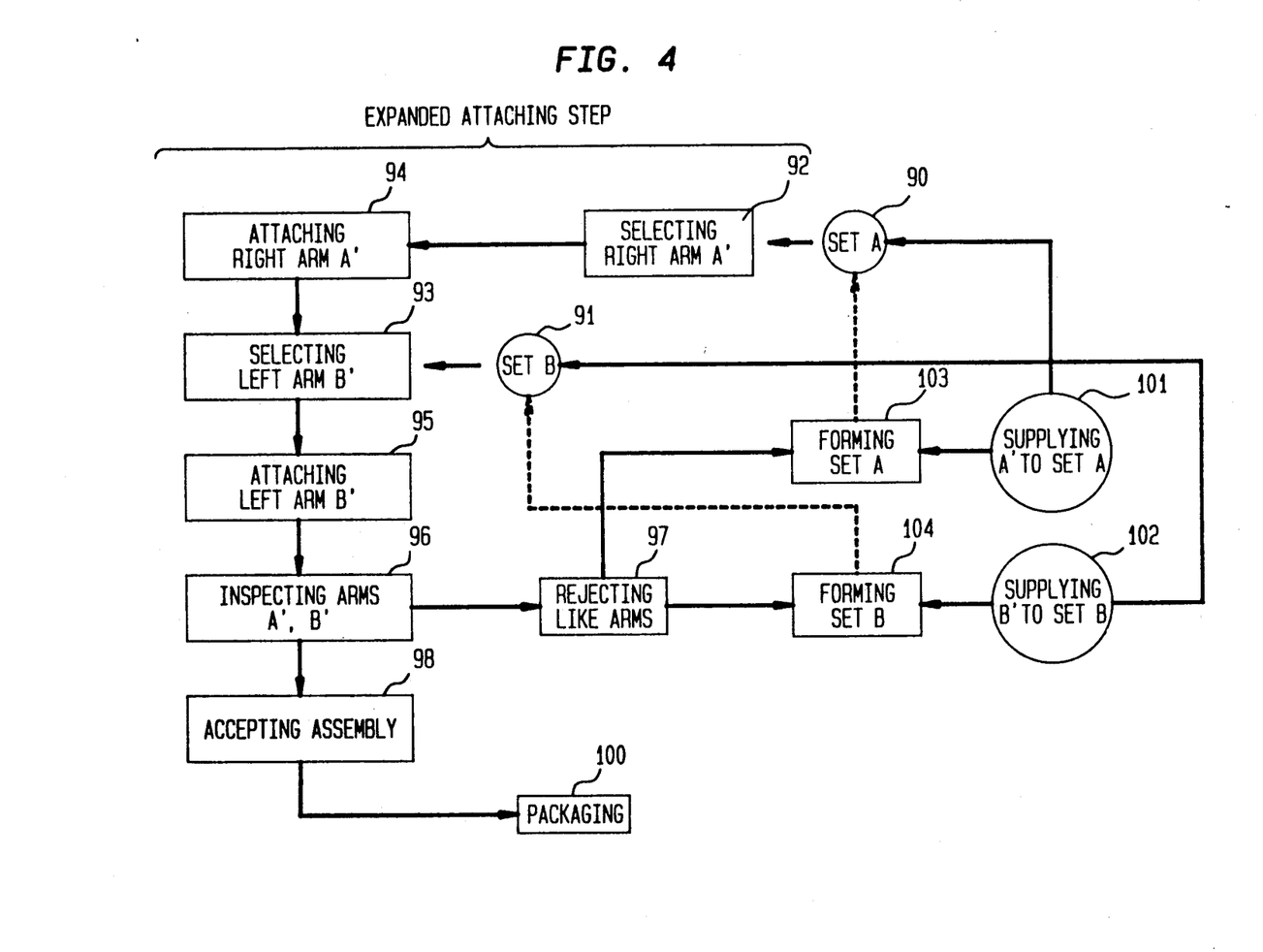
FIG. 4 is a flow diagram showing the method by which the left and right arms are attached to the left and right eye frames according to the novel invention.

Referring now to FIG. 4 there is shown a supplement to the basic method of producing eyeglasses like those shown in FIG. 1. FIG. 4 illustrates an expansion of the attaching step 87 shown in FIG. 3 wherein the assembly 10 is produced such that the right arm 30 is dissimilar from the left arm 32, for example a dissimilarity of color.

The attaching process in FIG. 4 commences with the establishment of a set A of right arms 90. Similarly a set B of left arms 91, each of which is distinct in color from the other, is manufactured and established. From the set A a right arm A' is randomly selected. From the set B a left arm B' is randomly selected. Selecting a right arm A' is illustrated in the flow diagram as step 92. Selecting a left arm B' is illustrated in the flow diagram as step 93. Next, step 94 is attaching the right arm A' wherein the right arm A' is attached to a random selection from a group of the assemblies of M' plus N' previously described. Next, step 95 is attaching the left arm B' to M' plus N'. Specifically, the right arm A' is attached to right sub-assembly N' of the assembly M' plus N' and the left arm B' is attached to the left sub-assembly M'.

The next step 96 requires comparatively inspecting the arm A' and B'. The inspecting step requires a comparison of A' to B' to determine whether or not A' is similar in color to B'. If A' is similar in color to B', i.e., A' is equal to B' in mathematical terms, then the combination A' plus M' plus N' plus B' is rejected in a rejecting step 97. However, if A' does not equal B' then the combination A' plus M' plus B' is passed to a packaging step 100 through the accepting assembly step 98. The packaging step 100 requires the packaging of the combination of A' plus M' plus N' plus B' for the product as shown in FIG. 1.

In the step 97 for rejecting like arms, i.e., rejecting the combination wherein A' is the same as or equal to B', a mechanism is provided wherein additional steps are utilized to replenish sets A and B. Step 101 is manufacturing of right arms A' and supplying set A. There is also shown step 102 for manufacturing of left arms B' of varying colors. The step 101 supplies A' members to set A. Step 102 supplies B' members to set B. Step 103 is forming set A. Step 104 is forming set B. The rejected like arms from step 97 are used with additional manufactured arms to form additional sets A and B.

Figure 5:
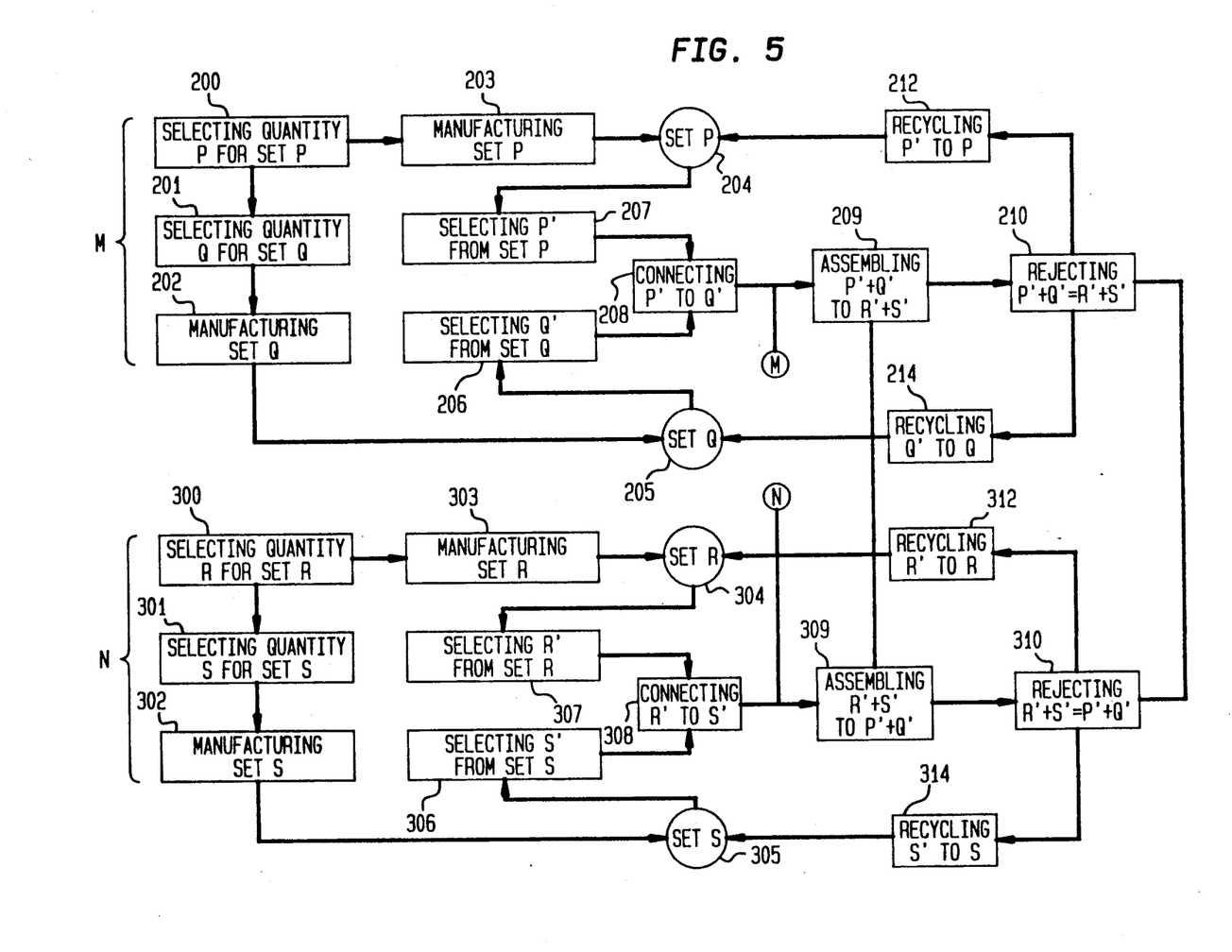
FIG. 5 is a flow diagram of the method for producing the assembly of the left and right eye frames according to the novel invention.

Now referring to FIG. 5 there is shown a flow diagram of steps involved in the method for producing the member of the group M and the members of the group N (as shown in FIG. 3). As previously indicated the set M is defined by the group 68 of left sub-assemblies, such as for example, the left sub-assembly 26, as shown in FIG. 1. The set N is defined by a group 69 of right sub-assemblies such as, for example, the sub-assembly 24 shown in FIG. 1. As shown in FIG. 5 the set M is produced by steps 200, 201 and 202, for example. Similarly set N is produced by steps 300, 301 and 302. The step 200 requires selecting a quantity P for the set P. For example, as shown in FIG. 3 the quantity for the set P may be 4 and the set P may be further defined as lenses 60, 61, 62 and 63 wherein each has a different geometric shape. The step 201 is selecting a quantity Q for the set Q wherein set Q is defined, for example, as a group of distinct colors for each of the frames 64, 65, 66 and 67 shown in FIG. 3. The quantity Q of the number of colors or shades for the various frames may be, for example 100. The next step is manufacturing set P, namely a step 203 wherein multiple quantities of each member P' for the set P are manufactured for combining with a member Q', selected from the set Q. Another step 202 in the method requires manufacturing the set Q according to the quantity Q specified. The set P is shown in the flow diagram as 204 and the set Q is shown in the flow diagram at 205. The next step is to select from the set Q the member Q' which is shown as step 206. Similarly step 207 shows selecting a member P' from the set P. Next, step 208 shows connecting P' to Q'. The product P'+Q' is passed to the assembling step 209 as P'+Q'.

In the process of producing set N there is a step 300 for selecting a quantity R for the set R. As shown in FIG. 3 there are four different shapes for the right lenses 70, 71, 72 and 73. Hence, in the example shown in FIG. 3, R is equal to 4 or has four numbers. Another step 301 requires selecting a quantity S for the set S. As shown in FIG. 3 the set S is comprised of the frames 74, 75, 76 and 77. The set S is defined by the various colors selected for the right frame portions. These colors may be for example 100 in number. Therefore, the quantity for the set S would then be 100 irrespective of the shape of a sub-frame 24, shown in FIG. 1, for example. The next step 302 requires manufacturing the set S which consists of 100 frames of different colors, for example, without regard to the shape thereof. Similarly, after selecting the quantity R the next step 303 requires manufacturing set R. The set R is defined in the flow diagram as set 304 and the set S is defined in the flow diagram as set 305. The next step 306 requires selecting a member S' from the set S and similarly the step 307 requires selecting a member R' from the set R. Thereafter, the member R' is connected to the member S' in step 208. The combination of R'+S' is used in the assembly step 309.

As shown in FIG. 5, the steps 209 and 309 are the same operation and each requires assembling P'+Q' to R'+S'. One half of the rejections from an inspection step 210 are recycled during recycling steps 212 and 214 to assist replenishing set P and set Q, with P' and Q', respectively. The other one half of the rejected items wherein P' plus Q' is equivalent to R' plus S' are placed into a rejection receptacle from which a disassembly occurs to assist replenishing the sets R and S. The step 310 also requires rejecting R' plus S' when it is equivalent to P' plus Q'. Step 310 is equivalent to step 210 and in the rejecting step 210 one half of the rejected items are placed into a bin which is used as a supplemental source to assist in replenishing the sets R and S and the other one half are placed into another bind which is used to assist in replenishing the sets P and Q. Thus, the rejected items comprising R' plus S' plus P' plus Q' utilize a step 312 for disconnecting R' and recycling R' to the set R. In another step 314 the unit R' plus S' plus P' plus Q' is equivalent to the frame 20, shown in FIG. 1. The step 314 required recycling of S' to help replenish the set S.

In the production process the set M is produced by combinations of P' with Q'. The set N is produced by combinations of R' with S'. P' plus Q' is rejected whenever as compared with R' plus S' there is no dissimilarity between the two sub-assemblies (other than spatial, i.e., one is for the right side of the eyeglass frame and the other is for the left side of the eyeglass frame or eyeglasses). The combination of P' plus Q' plus R' plus S' is acceptable, for example, provided if and one if one of the following occurs: (1) P' is a different color from R'; (2) P' is a different shape that R'; (3) Q' is of a different colors from S'; (4) or assuming Q' and S' are defined by the shapes of P' and R', respectively, if the geometric shape of Q' is different from the geometric shape of S'.

Figure 6:
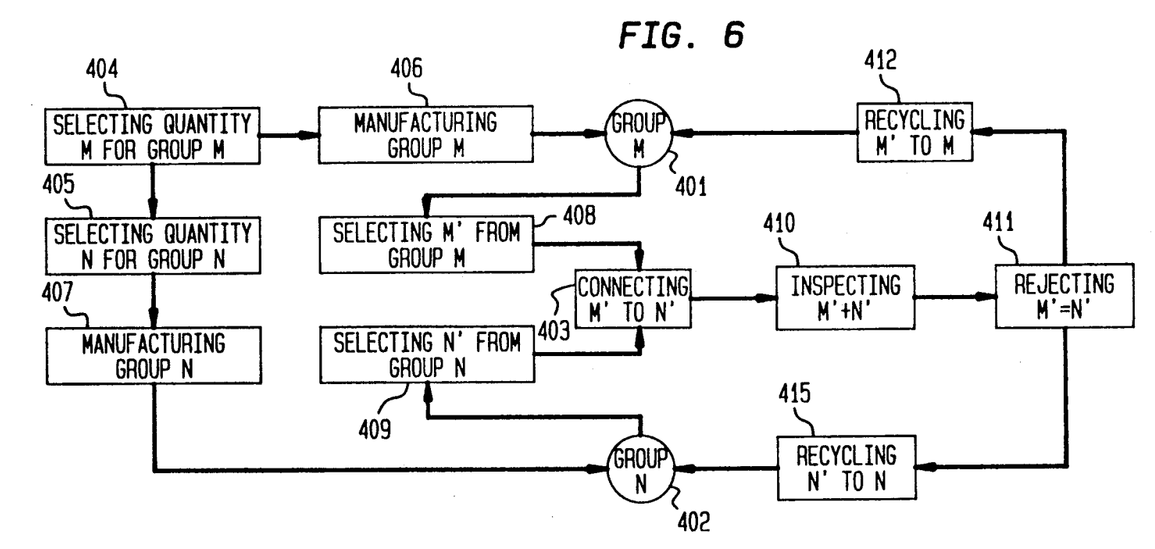
FIG. 6 is a graphical diagram showing the method for producing the left and right sub-assemblies and for assembling the eyeframes.

Referring now to FIG. 6, there is shown a flow diagram setting forth steps for combining members M' from the Group M with Member N' from the Group N. The Group M which is designated in FIG. 6 as a block 401 is comprised of combinations of P' plus Q' from the step 208, FIG. 5 wherein each P' plus Q' making up the Group M is distinct and different from the other. Similarly the block 402 in FIG. 6 designates a Group N which is made up of the products of the step 308 in FIG. 5 wherein R' is connected to S' and each of the combinations of R' to S' which is distinct from the other is used to make up the Group N. That is, each R' plus S' within the set N is distinguishable and distinct from every other R' plus S' within the Group N. Thus, the steps 209 and 309 for assembling R' plus S' with P' plus Q' are equivalent to the step 403 of FIG. 6 wherein M' is connected to N'.

In the production process to assure a large number of distinct and unqiue sets, i.e. distinct and unique products 10, a quantity is selected for the Group M shown by the step 404. Similarly, a quantity is selected for the Group N shown by the step 405. Afterwards, the next step 406 is either manufacturing Group M or the step 407 of manufacturing the Group N. The manufacturing step 406 is performed by connecting P' to Q' and placing each together in Group M. Similarly, the step 308 shown in FIG. 5 produces each N' and is equivalent to the step 407 for manufacturing the Group N. The step 407 requires connecting R' to S' and assembling each together in Group N. The quantity M for the set M is defined by the product P×Q. The size N for the Group N is limited by the product of R×S. In the final stages of the production method M' is randomly selected in step 408 and N' is randomly selected in step 409. Thus, each member of a set of M'+N', from which the frame 20 in FIG. 1 is ultimately provided, is produced by the step 403, there an M' is connected to an N'. Thereafter in step 404 M' plus N' is inspected to insure heterogeneity or dissimilarity within the final product.

In the method, as shown in FIG. 4, prior to the inspecting step 404 a left arm B' may be attached to the members of the Group M and a right arm A', such as 32 for example, may be attached to the members of the Group N. Thus, in the inspecting step 404 an inspection occurs to determine if M' is dissimilar from N' wherein the dissimilarity is difference in color between the right arm A' (for example the right arm 30 shown in FIG. 1), and the left arm B' (for example the left arm 32 shown in FIG. 1). Then the product of the step 403 is inspected in step 410. If the product is rejected this occurs in the rejecting step 411. Any rejection wherein M'=P'+Q'+B' is equivalent to N'=R'+S'+A' is recycled in steps 412 and 415 such that the item M' is disconnected from N' and placed in a bin or hopper for recycling of M' to help replenish the Group M and another portion of the items which are produced by the rejecting step 410 are placed into a bin for recyling of N' to help replenish the Group N. The novel method thus becomes partially self-sustaining and consumes all of its rejects.

The method produces a large number of distinct items based upon the numbers selected for the various sets. For example, one million is the number of possible unique items assuming that the quantity within the sets A, B, P, Q, R and S, is 10 distinct colors or shades of colors in each set, the colors or shades of colors in each set being different from the colors or shades of colors in every other set. The number of unique combinations possible utilizing the production process is 100 million or the product of $A \times B \times P \times Q \times R \times S$ or $100 \times 100 \times 10 \times 10 \times 10 \times 10$ if the visibly distinct colors or shades within sets A and B are each increased from 10 to 100.

While particular embodiments of the present invention have been shown described, changes and modifications will occur to those skilled in the art. It is intended in the appended claims to cover all such changes and modifications as fall within the true spirit and scope of the present invention.

What is claimed is:

1. A method for mass producing a multitude of distinct pairs of eyeglasses wherein each pair of said eyeglasses has at least two visually distinct parts, a right sub-assembly having right parts selected from a first group of right sub-assemblies wherein the first group contains a quantity N of right members, a left sub-assembly having left parts selected from a second group of left sub-assemblies wherein the second group contains a quantity M or left members, the method further comprising the steps of:

selecting a numerical quantity for M and N other than zero;

assembling a first group of right sub-assemblies containing M distinct right sub-assemblies;

assembling a second group of left sub-assemblies containing N distinct left sub-assemblies;

randomly selecting and removing a right sub-assembly from said first group;

randomly selecting and removing a left sub-assembly from said second group;

connecting said randomly selected right sub-assembly to said randomly selected left sub-assembly whereby an assembly is formed;

inspecting said assembly to determine that said assembly has at least two visually distinct parts;

rejecting each assembly wherein none of the left parts are distinct from the right parts;

disconnecting each assembly which is rejected into a right sub-assembly and a left sub-assembly;

recycling each said right sub-assembly which is disconnected into another group of right sub-assemblies containing M distinct right sub-assemblies;

recycling each said left sub-assembly which is disconnected into another group of distinct left sub-assemblies containing N distinct left sub-assemblies; whereby left and right arms are attached to each non-rejected assembly and said assembly with left and right arms attached is subsequently packaged.

2. The method of claim 1, further comprising the steps of forming said right sub-assembly by randomly selecting members P' from a first set P of right sub-frames wherein the first set contains a quantity P of visually distinct right sub-frames and combining with randomly selected members Q' from the second set Q' of distinct right lens wherein the second set contains a quantity Q of distinctly colored right lenses and selecting a numerical quantity for P and Q.

3. The method of claim 2 further comprising the steps of forming said left sub-assembly by randomly selecting members P' from a third set R of visually distinct left sub-frames wherein the third set contains a quantity R of distinctly colored left sub-frames and combining with randomly selected members S' from a fourth set of distinct left lenses wherein the fourth set contains a quantity S of distinctly colored left lenses and selecting a numerical quantity for R and S.

4. The method of claim 3 wherein each member of said second set is geometrically different from every other member.

5. The method of claim 4 wherein each member of said fourth set is geometrically different from every other member.

6. The method of claim 5 wherein each member of said second set is a different color from every other member.

7. The method of claim 6 wherein each member of said fourth set is different in color from every other member.

8. The method of claim 3 wherein each member of said first set is geometrically different from every other member.

9. The method of claim 4 wherein each member of said third set is geometrically different from every other member.

10. The method of claim 8 wherein said third set is geometrically heterogeneous.

11. The method of claim 9 wherein said fifth set is geometrically heterogenous.

12. The method of claim 1 wherein each pair of said eyeglasses has a right arm attached to said right sub-assembly and a left arm attached to said left sub-assembly the right arm being selected from a set A of differently colored right arms of a quantity A, the left arm being selected from a set B of differently colored left arms of a quantity B, the method further comprising the steps of:

selecting a numerical size for A and B;

randomly selecting and removing a right arm from the set A;

attaching said selected right arm from set A to the right sub-assembly;

randomly selecting and removing a left arm from the set B;

attaching said selected left arm from set B to the left sub-assembly;

disconnecting the last said arms from each assembly which is rejected;

recycling each said right arm which is disconnected into another set of differently colored right arms containing A right arms;

recycling each said left arm which disconnected into another set of differently colored left arms containing B distinct left arms, whereby each rejected left arm and each rejected right arm is subsequently attached to an assembly.

13. A method for mass producing pairs of heterogeneous eyeglass frames wherein each pair of siad heterogeneous eyeglass frames has a right sub-assembly and a left sub-assembly, the right sub-assembly being selected from a first set of right sub-assemblies wherein the first set contains M right members, the left sub-assembly being selected from a second set of left sub-assemblies wherein the second set contains N left members, the method further comprising the steps of:
  selecting a numerical size for M and N;
  assembling a first set of right sub-assemblies containing a quantity M of right sub-assemblies;
  assembling a second set of left sub-assemblies containing a quantity N of left sub-assemblies;
  randomly selecting and removing a right sub-assembly from said first set;
  randomly selecting and removing a left sub-assembly from said record set;
  connecting said randomly selected right sub-assembly to said randomly selected left sub-assembly whereby an assembly is formed;
  inspecting said assembly to determine heterogeneity of said assembly;
  rejecting each assembly which is homogeneous;
  disconnecting each assembly which is rejected into a right sub-assembly and a left sub-assembly;
  recycling each said right sub-assembly which is disconnected into another set of right sub-assemblies containing M right sub-assemblies;
  recycling each said left sub-assembly which is disconnected into another set of left sub-assemblies containing N left sub-assemlies; whereby left and right arms are attached to each non-rejected heterogeneous assembly whereby assembly is subsequently packaged.

14. The method of claim 13 wherein said right sub-assembly comprises a right sub-frame adapted to contain a right lens, and further comprising the steps of forming said right sub-assembly from a third set of right sub-frames wherein the third set contains a quantity P of visually distinct right sub-frames and from a fourth set of right arms wherein the fourth set contains a quantity A of distinctly colored right arms and selecting a numerical value for P and A.

15. The method of claim 14 wherein said left sub-assembly comprises a left sub-frame adapted to contain a left lens and further comprising the steps of assembling said left sub-assembly from a fifth set of left sub-frames wherein the fifth set contains a quantity R of visually distinct left sub-frames and a sixth set of distinct left arms wherein the sixth set contains a quantity B of differently colored left arms, and selecting a numerical value for R and A.

16. The method of claim 13 wherein each pair of said eyeglass frames has a right arm attached to said right sub-assembly and a left arm attached to said left sub-assembly, the right arm being selected from a set A of differently colored right arms of a quantity A, the left arm being selected from a set B of differently colored left arms of a quantity B, the method further comprising the steps of:
  selecting a numerical size for A and B;
  randomly selecting and removing a right arm from the set A;
  attaching said selected right arm from set A to the right sub-assembly;
  randomly selecting and removing a left arm from the set B;
  attaching said selected left arm from set B to the left sub-assembly;
  disconnecting the last said arms from each assembly which is rejected;
  recycling each said right arm which is disconnected into another set of differently colored right arms containing A right arms;
  recycling each said left arm which disconnected into another set of differently colored left arms containing B distinct left arms, whereby each rejected left arm and each rejected arm is subsequently attached to an assembly.

* * * * *